United States Patent
Peng et al.

(10) Patent No.: US 10,368,254 B2
(45) Date of Patent: Jul. 30, 2019

(54) DATA FORWARDING METHOD AND CONTROLLER

(71) Applicant: Huawei Technologies Co., Ltd., Shenzhen (CN)

(72) Inventors: Chenghui Peng, Munich (DE); Jinfang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 15/594,296

(22) Filed: May 12, 2017

(65) Prior Publication Data

US 2017/0251384 A1    Aug. 31, 2017

Related U.S. Application Data

(63) Continuation of application No. PCT/CN2014/091073, filed on Nov. 14, 2014.

(51) Int. Cl.
*H04L 12/28*    (2006.01)
*H04W 24/02*    (2009.01)
(Continued)

(52) U.S. Cl.
CPC ......... *H04W 24/02* (2013.01); *H04L 41/0806* (2013.01); *H04L 41/12* (2013.01);
(Continued)

(58) Field of Classification Search
CPC ... H04W 24/02; H04W 24/10; H04W 72/085; H04W 72/048; H04W 88/18;
(Continued)

(56) References Cited

U.S. PATENT DOCUMENTS 8,693,470 B1 *   4/2014   Maxwell ............... H04L 45/302
                                                370/230
10,193,759 B2 *  1/2019   Zhang .................... H04L 45/38
                         (Continued)

FOREIGN PATENT DOCUMENTS

CN       1984020 A      6/2007
CN     101345919 A      1/2009
                 (Continued)

*Primary Examiner* — Chuong T Ho

(74) *Attorney, Agent, or Firm* — Leydig, Voit & Mayer, Ltd.

(57) ABSTRACT

A data forwarding method and a controller are disclosed. The method includes: obtaining, by a controller, first identification information of a terminal, where the first identification information includes terminal capability information, service type information, and quality of service QoS information of the terminal (501); determining N functional modules in L network nodes from M network nodes according to the first identification information, where the N functional modules are configured to process a data stream that corresponds to a service of the terminal (502); and configuring, for the L network nodes, corresponding forwarding entries for forwarding the data stream, where the forwarding entries are used to enable the L network nodes to process the data stream by using the N functional modules (503).

12 Claims, 9 Drawing Sheets

(51) Int. Cl.
    *H04W 88/18*     (2009.01)
    *H04L 12/801*     (2013.01)
    *H04L 29/08*     (2006.01)
    *H04W 24/10*     (2009.01)
    *H04W 72/04*     (2009.01)
    *H04W 72/08*     (2009.01)
    *H04L 12/751*     (2013.01)
    *H04L 12/851*     (2013.01)
    *H04L 12/911*     (2013.01)
    *H04L 12/24*     (2006.01)
    *H04L 12/26*     (2006.01)
    *H04L 12/803*     (2013.01)

(52) U.S. Cl.
    CPC .......... *H04L 43/0876* (2013.01); *H04L 45/02* (2013.01); *H04L 47/14* (2013.01); *H04L 47/24* (2013.01); *H04L 47/781* (2013.01); *H04L 67/303* (2013.01); *H04W 24/10* (2013.01); *H04W 72/048* (2013.01); *H04W 72/085* (2013.01); *H04W 88/18* (2013.01); *H04L 47/125* (2013.01)

(58) Field of Classification Search
    CPC . H04L 41/12; H04L 41/0806; H04L 43/0876; H04L 47/24; H04L 45/02; H04L 47/14; H04L 47/781; H04L 67/303; H04L 47/125
    USPC ........................................................ 370/392
    See application file for complete search history.

(56) References Cited

U.S. PATENT DOCUMENTS

| | | | | |
|---|---|---|---|---|
| 2012/0281711 | A1* | 11/2012 | Karaoguz | H04L 45/00 370/419 |
| 2014/0164106 | A1* | 6/2014 | Naik | G06Q 30/0277 705/14.49 |
| 2015/0124826 | A1* | 5/2015 | Edsall | H04L 12/4633 370/392 |
| 2016/0337196 | A1* | 11/2016 | Zhang | H04L 45/38 |

FOREIGN PATENT DOCUMENTS

| | | |
|---|---|---|
| CN | 102238073 A | 11/2011 |
| CN | 102571856 A | 7/2012 |
| CN | 104125146 A | 10/2014 |
| KR | 20020053954 A | 7/2002 |
| KR | 101256916 B1 | 4/2013 |

* cited by examiner

DATA FORWARDING METHOD AND CONTROLLER

CROSS-REFERENCE TO RELATED APPLICATIONS

This application is a continuation of International Application No. PCT/CN2014/091073, filed on Nov. 14, 2014, the disclosure of which is hereby incorporated by reference in its entirety.

TECHNICAL FIELD

The present invention relates to the field of communications technologies, and in particular, to a data forwarding method and a controller.

BACKGROUND

There are four generations of existing wireless cellular access standards, including the obsolete first-generation analog standard access, the second-generation Global System for Mobile Communications (Global System for Mobile Communication, GSM for short) that focuses on digital speech, the third-generation mobile communications system that is represented by the Universal Mobile Telecommunications System (English: Universal Mobile Telecommunications System, UMTS for short), the Code Division Multiple Access 2000 (English: Code Division Multiple Access 2000, CDMA 2000 for short), the Time Division-Synchronous Code Division Multiple Access (English: Time Division-Synchronous Code Division Multiple Access, TD-SCDMA for short) and that combines wireless communication with multimedia communication such as Internet communication, and the fourth-generation Long Term Evolution (English: Long Term Evolution, LTE for short) characterized in broadbandization and a high rate. For the four generations of access standards, different frequency bands are occupied, and different access technologies and different data processing protocols are used. Although the era of the fourth-generation mobile communications technologies ($4^{th}$-Generation, 4G for short) has come, in consideration of backward compatibility of networks, these access standards will coexist for a long time to provide services for users. In addition to these access standards, there are wireless access standards such as the Worldwide Interoperability for Microwave Access (English: Worldwide Interoperability for Microwave Access, WiMAX for short) and the Wireless-Fidelity (English: Wireless-Fidelity, WiFi for short). Because telecom operation licenses are not required, WiFi is widely used in crowded hotspot areas such as airports, bus stations, coffee shops, and libraries. Meanwhile, WiFi also provides a home wireless access manner, and is an important supplement to cellular mobile networks.

As various wireless access standards co-exist and wireless service diversity further develops, an existing working mode in which an access network node or a forwarding node processes all services by using one set of fixed protocol stacks cannot efficiently adapt to the diversity of services. Consequently, efficiency of processing a service of a terminal is greatly reduced.

SUMMARY

Embodiments of the present invention provide a data forwarding method and a controller, so as to improve efficiency of processing a service of a terminal.

To achieve the foregoing objective, in the embodiments of the present invention, the following technical solutions are used.

According to a first aspect, an embodiment of the present invention provides a controller, where the controller includes: a first obtaining unit, a selection unit and a first configuration unit, where the first obtaining unit is configured to obtain first identification information of a terminal, where the first identification information includes terminal capability information, service type information, and quality of service QoS information of the terminal;

the selection unit is configured to determine N functional modules in L network nodes from M network nodes according to the first identification information, where the N functional modules are configured to process a data stream that corresponds to a service of the terminal; and the first configuration unit is configured to configure, for the L network nodes, corresponding forwarding entries for forwarding the data stream, where the forwarding entries are used to enable the L network nodes to process the data stream by using the N functional modules.

With reference to the first aspect, in a first possible implementation manner, the controller further includes: a second obtaining unit, where the second obtaining unit is configured to obtain information about an access standard supported by a network node accessed by the terminal; and the selection unit is specifically configured to:

determine, according to the terminal capability information of the terminal, information about an access standard supported by the terminal;

determine an access standard of the terminal according to the information about an access standard supported by the terminal and the information about an access standard supported by a network node accessed by the terminal; and select the N functional modules in the L network nodes from the M network nodes according to the access standard of the terminal, the service type information, and the QoS information.

With reference to the first aspect or the first possible implementation manner, in a second possible implementation manner, the controller further includes: a receiving unit and a second configuration unit, where the receiving unit is configured to receive a resource status reported by a network node, where the resource status includes a transmission resource status, a computing resource status, and an air interface radio frequency resource status of the network node; and the second configuration unit is configured to configure, according to the resource status of the network node, a type of the network node and a function of a functional module included in the network node, where the type of the network node includes an access device and a forwarder.

With reference to the second possible implementation manner, in a third possible implementation manner, the receiving unit is further configured to receive a network topology status reported by the network node; and the selection unit is specifically configured to:

determine the N functional modules in the L network nodes according to the first identification information, the M network nodes, load of functional modules included in the M network nodes, and network topology statuses of the M network nodes.

According to a second aspect, an embodiment of the present invention provides a data forwarding method, where the method includes:

obtaining, by a controller, first identification information of a terminal, where the first identification information includes terminal capability information, service type information, and quality of service QoS information of the terminal;

determining, by the controller, N functional modules in L network nodes from M network nodes according to the first identification information, where the N functional modules are configured to process a data stream that corresponds to a service of the terminal; and configuring, by the controller for the L network nodes, corresponding forwarding entries for forwarding the data stream, where the forwarding entries are used to enable the L network nodes to process the data stream by using the N functional modules.

With reference to the second aspect, in a first possible implementation manner, before the determining, by the controller, N functional modules in L network nodes from M network nodes according to the first identification information, the method further includes:

obtaining information about an access standard supported by a network node accessed by the terminal; and the determining, by the controller, N functional modules in L network nodes from M network nodes according to the first identification information specifically includes:

determining, by the controller according to the terminal capability information of the terminal, information about an access standard supported by the terminal;

determining, by the controller, an access standard of the terminal according to the information about an access standard supported by the terminal and the information about an access standard supported by a network node accessed by the terminal; and selecting, by the controller, the N functional modules in the L network nodes from the M network nodes according to the access standard of the terminal, the service type information, and the QoS information.

With reference to the second aspect or the first possible implementation manner, in a second possible implementation manner, before the obtaining, by a controller, first identification information of a terminal, the method further includes:

receiving, by the controller, a resource status reported by a network node, where the resource status includes a transmission resource status, a computing resource status, and an air interface radio frequency resource status of the network node; and configuring, by the controller according to the resource status of the network node, a type of the network node and a function of a functional module included in the network node, where the type of the network node includes an access device and a forwarder.

With reference to the second possible implementation manner, in a third possible implementation manner, before the obtaining, by a controller, first identification information of a terminal, the method further includes:

receiving, by the controller, a network topology status reported by the network node; and the determining, by the controller, N functional modules in L network nodes from M network nodes according to the first identification information specifically includes:

determining, by the controller, the N functional modules in the L network nodes according to the first identification information, the M network nodes, load of functional modules included in the M network nodes, and network topology statuses of the M network nodes.

According to a third aspect, an embodiment of the present invention provides a controller, where the controller includes: a processor, a bus, and a memory, where the processor obtains, by using the bus, an instruction stored in the memory, so as to:

obtain first identification information of a terminal, where the first identification information includes terminal capability information, service type information, and quality of service QoS information of the terminal;

determine N functional modules in L network nodes from M network nodes according to the first identification information, where the N functional modules are configured to process a data stream that corresponds to a service of the terminal; and configure, for the L network nodes, corresponding forwarding entries for forwarding the data stream, where the forwarding entries are used to enable the L network nodes to process the data stream by using the N functional modules.

With reference to the third aspect, in a first possible implementation manner, the processor is specifically configured to:

obtain information about an access standard supported by a network node accessed by the terminal; and determine, according to the terminal capability information of the terminal, information about an access standard supported by the terminal;

determine an access standard of the terminal according to the information about an access standard supported by the terminal and the information about an access standard supported by a network node accessed by the terminal; and select the N functional modules in the L network nodes from the M network nodes according to the access standard of the terminal, the service type information, and the QoS information.

With reference to the third aspect or the first possible implementation manner, in a second possible implementation manner, the controller further includes a receiver, where the receiver is configured to receive a resource status reported by a network node, where the resource status includes a transmission resource status, a computing resource status, and an air interface radio frequency resource status of the network node; and the processor is further configured to configure, according to the resource status of the network node, a type of the network node and a function of a functional module included in the network node, where the type of the network node includes an access device and a forwarder.

With reference to the second possible implementation manner, in a third possible implementation manner, the receiver is further configured to receive a network topology status reported by the network node; and the processor is specifically configured to:

determine the N functional modules in the L network nodes according to the first identification information, the M network nodes, load of functional modules included in the M network nodes, and network topology statuses of the M network nodes.

For the data forwarding method and the controller provided in the embodiments of the present invention, the controller selects L network nodes from M network nodes to process a data stream that corresponds to a service of a terminal, so as to avoid a problem of relatively low processing efficiency of processing a corresponding data stream by using a single network node when a service corresponding to the network node bursts or when the network node needs to additionally support another access standard or when the network node needs to use a more complex protocol stack processing procedure or when another case occurs.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
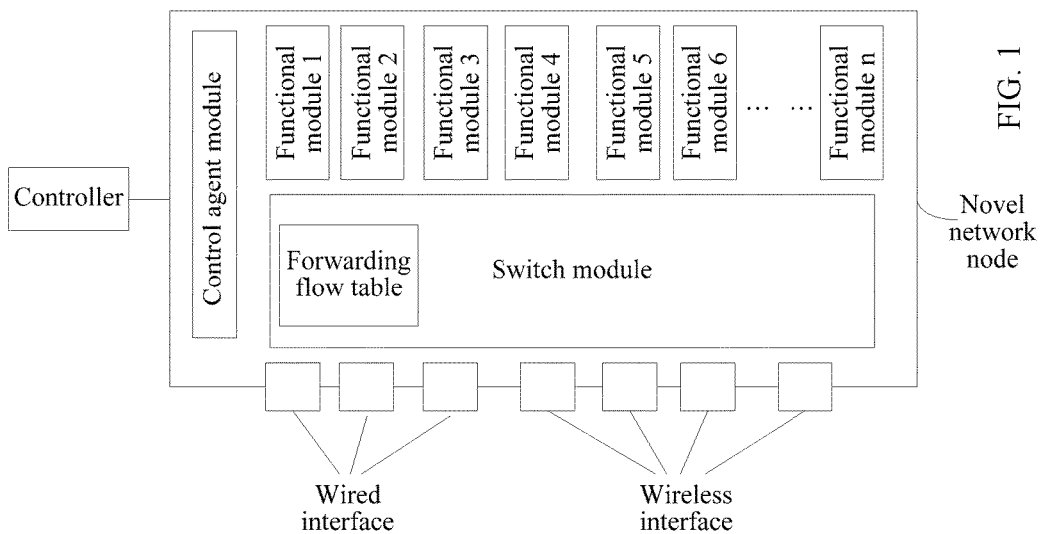
FIG. 1 is a schematic diagram of a novel network node.

Referring to FIG. 1, a novel network node is described as an example. The network node may be used as an access device, or may be used as a forwarder. As shown in FIG. 1, the novel network node mainly consists of a control agent module, a switch module, and functional modules such as a functional module 1 to a functional module n that are shown in FIG. 1. In addition, the novel network node is further equipped with a wireless interface and a wired interface. The wireless interface is mainly configured to connect to a terminal, and the wired interface is mainly configured to forward data among network nodes.

As shown in FIG. 1, such a novel network node is controlled by a controller. Because the novel network node, in terms of hardware, may be a programmable logical device, for example, a field programmable gate array FPGA, a digital signal processor, or a general-purpose server, the controller may instantiate the novel network node according to an actual requirement of a network, so as to make the novel network node into an access device or a forwarder. Further, the controller may generate, in the novel network node according to actual requirements of services of a terminal in the network, functions of functional modules for implementing the requirements of the service. Referring to FIG. 1, for example, the functional module 1 is generated for encryption processing of data, the functional module 2 is generated for header compression processing of data, and the functional module 3 is generated for link layer processing of data.

There are various services such as a text service, a voice service, an e-mail service, and a video service on a network. For services of different types, different processing manners are required during transmission on the network. For example, during transmission of data of a downlink public video service on an air interface, the data does not need encryption processing, so that a data packet of the video service does not need to be encrypted by using the Packet Data Convergence Protocol PDCP. However, during transmission of data of another service on the air interface, the data may need to be encrypted.

By using the novel network node shown in FIG. 1, customized relationships among a network node, a service, and an access standard may be implemented. For example, if a video service of all services corresponding to the novel network node is a main service, the novel network node is mainly responsible for processing of the video service through configuration of the controller, thereby resolving an existing problem of greatly reduced service processing flexibility caused by a failure to effectively adapt to diversity of services because all access network nodes or forwarding nodes process all services by using one set of fixed protocols.

However, a processing capability of a novel network node is limited. For example, when a phenomenon such as a tidal effect occurs suddenly in a service corresponding to the novel network node, for example, when video services burst, but the novel network node has an insufficient capability of processing a large quantity of video services of is. As a result, efficiency of processing the video services is lowered. Alternatively, if a network is initially designed to support the LTE access standard, and a novel network node has a limited capability of processing a service of another access standard. As a result, when the network node needs to support simultaneously multiple types of access standards, the novel network node also has lowered efficiency of processing another access standard.

Figure 2:
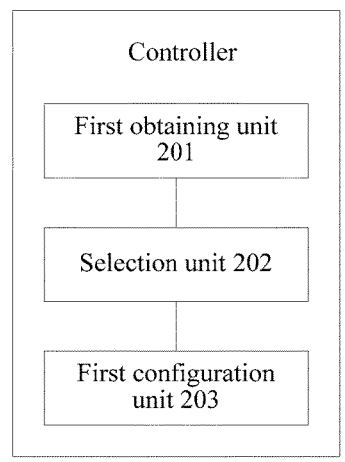
FIG. 2 is a first schematic diagram of a controller.

To resolve the problem, an embodiment of the present invention provides a controller. Referring to FIG. 2, the controller includes: a first obtaining unit 201, a selection unit 202, and a first configuration unit 203.

The first obtaining unit 201 is configured to obtain first identification information of a terminal, where the first identification information includes terminal capability information, service type information, and quality of service QoS information of the terminal.

The selection unit 202 is configured to determine N functional modules in L network nodes from M network nodes according to the first identification information. The N functional modules are configured to process a data stream that corresponds to a service of the terminal.

The first configuration unit 203 is configured to configure, for the L network nodes, corresponding forwarding entries for forwarding the data stream. The forwarding entries are used to enable the L network nodes to process the data stream by using the N functional modules.

Figure 3:
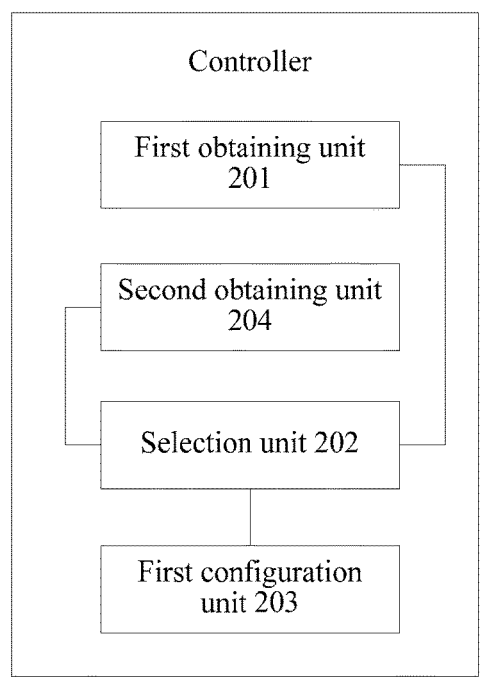
FIG. 3 is a second schematic diagram of a controller.

Specifically, referring to FIG. 3, the controller further includes: a second obtaining unit 204.

The second obtaining unit 204 is configured to obtain information about an access standard supported by a network node accessed by the terminal.

The selection unit 202 is specifically configured to:

determine, according to the terminal capability information of the terminal, information about an access standard supported by the terminal;

determine an access standard of the terminal according to the information about an access standard supported by the terminal and the information about an access standard supported by a network node accessed by the terminal; and select the N functional modules in the L network nodes from the M network nodes according to the access standard of the terminal, the service type information, and the QoS information.

Figure 4:
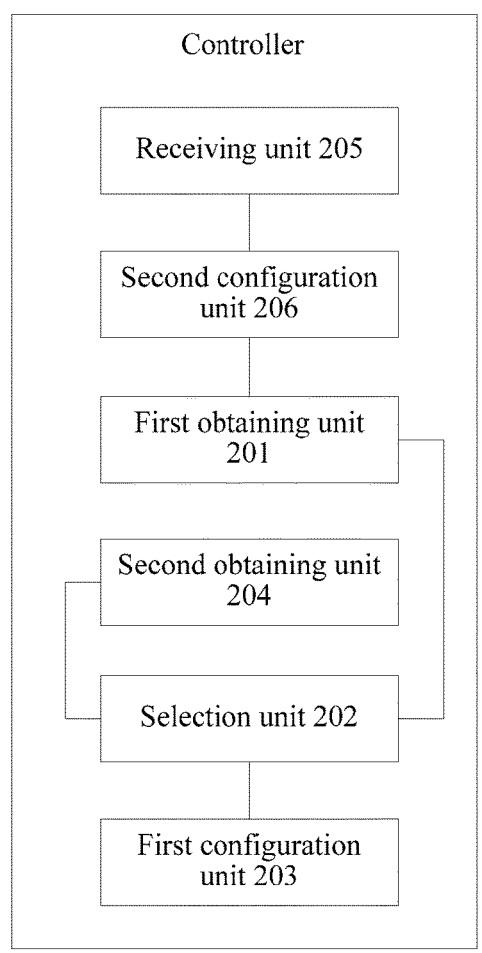
FIG. 4 is a third schematic diagram of a controller.

Further, referring to FIG. 4, the controller further includes: a receiving unit 205 and a second configuration unit 206.

The receiving unit 205 is configured to receive a resource status reported by a network node, where the resource status includes a transmission resource status, a computing resource status, and an air interface radio frequency resource status of the network node.

The second configuration unit 206 is configured to configure, according to the resource status of the network node, a type of the network node and a function of a functional module included in the network node. The type of the network node includes an access device and a forwarder.

Optionally, the receiving unit 205 is further configured to receive a network topology status reported by the network node.

The selection unit 202 is specifically configured to:

determine the N functional modules in the L network nodes according to the first identification information, the M network nodes, load of functional modules included in the M network nodes, and network topology statuses of the M network nodes.

It should be noted that reference may be made to method embodiments for detailed technical features of this embodiment of the present invention, which are not described in this embodiment of the present invention.

For the controller provided in this embodiment of the present invention, the controller selects, according to terminal capability information of a terminal, service type information, and QoS information, N functional modules in L network nodes from M network nodes, where the N functional modules are all functional modules required for processing a data stream that corresponds to a service of the terminal, and the controller configures, for the L network nodes, corresponding entries for forwarding the data stream, so as to enable the data stream to be eventually forwarded to a target address after the data stream is processed by the required N modules. By means of such a method, multiple network nodes together service a data stream corresponding to one service, thereby reducing complexity of processing of a single network node and improving processing efficiency.

Figure 5:
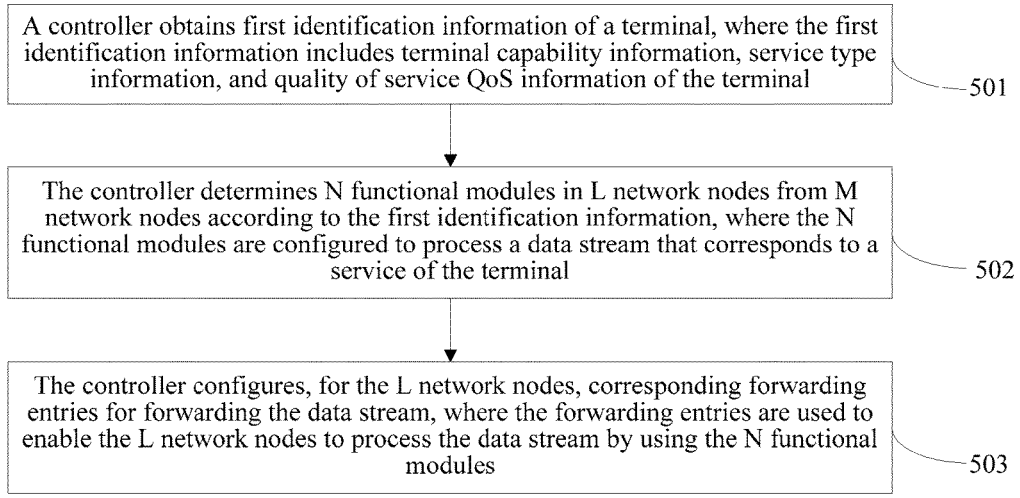
FIG. 5 is a flowchart of a data forwarding method.

To resolve a problem of low efficiency of processing a service of a terminal by a single novel network node shown in FIG. 1, referring to FIG. 5, an embodiment of the present invention further provides a data forwarding method. The method includes the following steps.

501. A controller obtains first identification information of a terminal, where the first identification information includes terminal capability information, service type information, and quality of service QoS information of the terminal.

Figure 6:
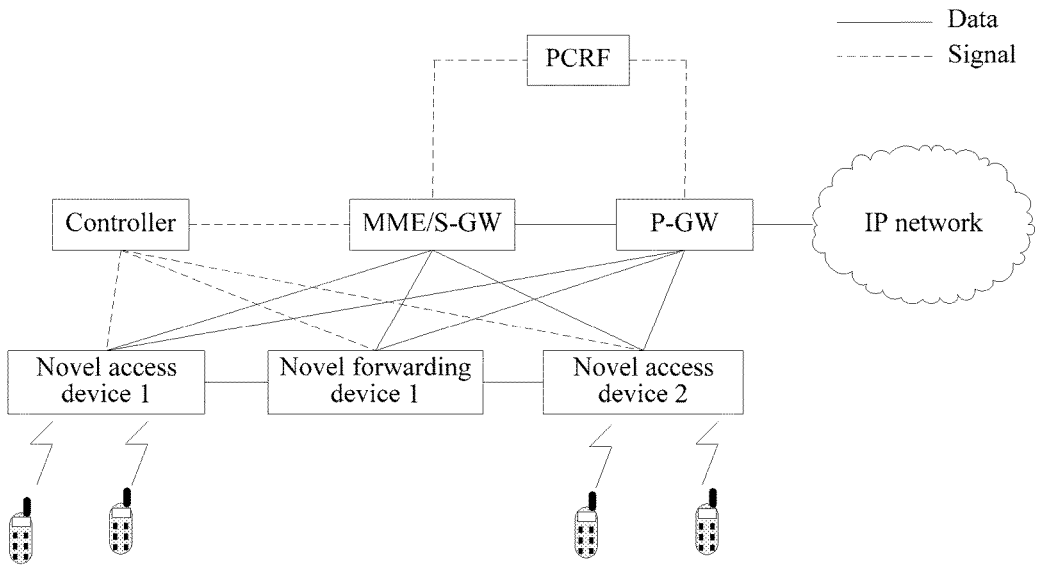
FIG. 6 is a schematic diagram of connection relationships among a controller, a novel network node, and another network element in an LTE network.

Referring to FIG. 6, a schematic diagram of connection relationships among a controller, a novel network node, and another network element in an LTE network is described as an example. The controller and an MME/SGW may be located in one physical device, or may be located in different physical devices. An example in which the controller and the MME/SGW are located in a same physical device is used. When a terminal needs to send uplink data or receive downlink data, the terminal sends a service request message to the MME/SGW by using the novel network node accessed by the terminal. The service request information includes at least terminal identification information of the terminal that sends the service request, and may further include service type information.

It should be noted that the terminal identification information may be bound to a service type of the service. In this case, the service type information may be not included in the service request information.

Specifically, the MME/SGW sends the service request information to a policy and charging rule function unit PCRF. The PCRF obtains the terminal capability information, and the service type information and quality of service (English: Quality of Service, QoS for short) parameter information of the service of the terminal according to the terminal identification information and the service request information in the service request information, or according to only the terminal identification information when the terminal identification information and the service type information are bound. The terminal capability information includes information about an access standard supported by the terminal. The QoS information includes information such as a transmission rate, a transmission delay, and erroneous data packet processing of data that corresponds to the service request. The PCRF sends the terminal capability information, the service type information of the service, and the quality of service information of the terminal to the MME/SGW.

The controller obtains first identification information of the terminal from the MME/SGW, where the first identification information includes at least the terminal capability information, the service type information, and the quality of service QoS information of the service of the terminal.

502. The controller determines N functional modules in L network nodes from M network nodes according to the first identification information, where the N functional modules are configured to process a data stream that corresponds to a service of the terminal.

The controller obtains, according to the terminal capability information of the terminal in the first identification information, an access standard, for example, LTE or WiFi, supported by the terminal, and the controller obtains, according to the QoS parameter information of the service, information such as a transmission rate, a transmission delay, and erroneous data packet processing of data that corresponds to the service request.

The controller determines, according to an access standard supported by the terminal and an access standard supported by a network node accessed by the terminal and by using a preset policy such as a preset algorithm, an access standard for the terminal. The controller may obtain, in multiple manners, an access standard supported by the network node accessed by the terminal. For example, the controller may prestore the information about an access standard supported by the network node, or may obtain, through signaling exchange with the network node, the information about an access standard supported by the network node. A specific manner is not limited in this embodiment of the present invention.

The controller determines, according to the access standard determined for the terminal and the service type and the QoS information of the service of the terminal, which processing processes are required for the service of the terminal.

It should be noted that the functional module included in the network node is configured to perform particular user-plane data processing, for example, MAC layer processing, RLC layer processing, header compression processing, encryption processing, IP layer processing, UDP processing, TCP processing or application optimization.

For example, after receiving first identification information that is sent by a terminal and that is about an uplink service, the controller determines, according to terminal capability information in the first identification information, that the terminal can support the LTE wireless access standard, the WiFi wireless access standard, and the 4G wireless access standard, and the controller determines, for the terminal according to an access standard supported by the network node accessed by the terminal and by using a preset algorithm, an access standard such as the LTE wireless access standard. The controller determines, according to the service type information and the QoS information in the first identification information, that the service is a video service that allows transmission of an erroneous data packet. In this case, the controller determines that LTE physical layer processing and LTE MAC layer processing need to be performed on a data packet that corresponds to the data stream. Because the video service is insensitive to a packet loss, the data packet further needs to be processed by an unacknowledged mode (English: Unacknowledgement, UM for short) of an LTE RLC layer. Because a public video does not need to be encrypted, a PDCP encryption module is not required to process the data packet.

By means of the foregoing determining process, the controller determines that for an uplink video service, a data packet is transmitted by using the LTE access standard, LTE physical layer processing, LTE MAC layer processing, and LTE RLC layer processing need to be performed. Based on this, the controller selects the N functional modules in the L network nodes from the M network nodes. For example, the controller determines that two network nodes, that is, a network node 1 and a network node 2, of the M network nodes process the data stream, and determines that an LTE physical layer processing functional module in the network node 1 and an LTE MAC layer processing functional module and an LTE RLC layer processing functional module in the network node 2 process the data stream.

For another example, a novel service such as a service of machine to machine M2M wireless communication on a network has a large quantity of connections and has strict delay requirements, and data on an application layer is directly carried on a physical channel. An example in which the terminal is connected to the network node by using the LTE wireless access standard is used. Functional modules selected by the controller to process such a service include: an LTE PHY and an App. The App is a corresponding application layer processing module.

503. The controller configures, for the L network nodes, corresponding forwarding entries for forwarding the data stream, where the forwarding entries are used to enable the L network nodes to process the data stream by using the N functional modules.

Specifically, the forwarding entry includes a one-to-one correspondence between a matching entry and an action entry. The matching entry may be a port, an address, a protocol type, or the like of an Ethernet, IP, TCP, or the like, and further includes some matching entries such as a base station identifier, an antenna identifier, a physical channel identifier, a logical channel identifier, and a user identifier on a wireless network. The action entry includes a port to which data is to be transmitted, modification of a data packet header, discarding of a data packet, and the like.

For example, a terminal 1 is connected to the network node 1, and the terminal 1 sends uplink data by using the network node 1. If the LTE access standard is used for a first service of the terminal 1 and the 4G access standard is used for a second service of the terminal 1, the controller determines that the network node 2 that is mainly configured to process a data packet sent by using the LTE access standard is required to process a data packet corresponding to the first service of the terminal 1, and the controller determines that a network node 3 that is mainly configured to process a data packet sent by using the 4G access standard is required to process a data packet corresponding to the second service of the terminal 1. The network node 1 is only responsible for forwarding data of the first service to the network node 2, or forwarding data of the second service to the network node 3, and does not process a data packet. Functional modules 1 to 3 in the network node 2 process a data stream of the first service, and functional modules 2 to 5 in the network node 3 process a data stream of the second service.

Figure 7:
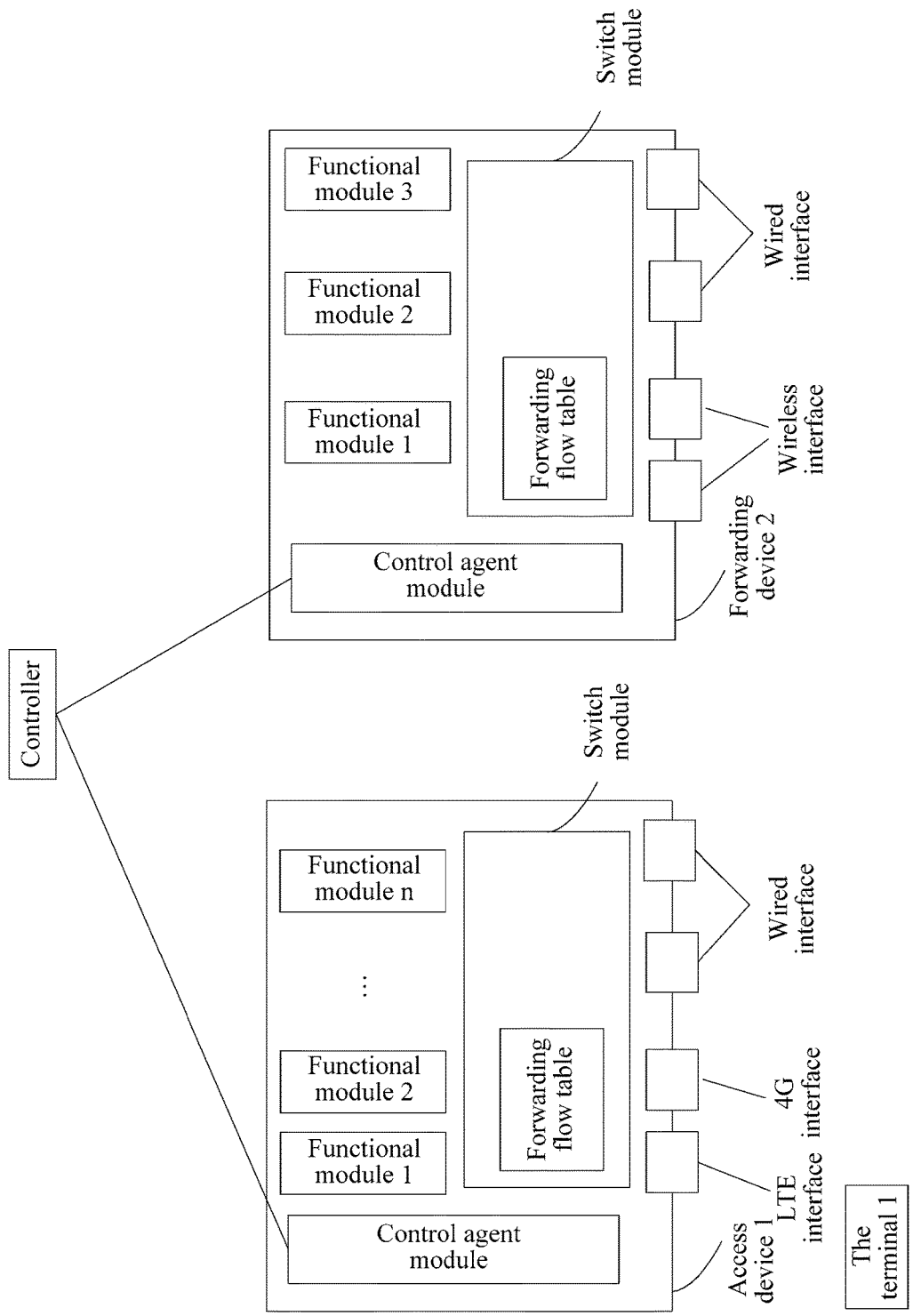
FIG. 7 is a schematic diagram of data forwarding.

Referring to FIG. 7, if the service is the first service, the controller separately configures forwarding entries for the network node 1 and the network node 2. After receiving a data packet of the first service, the network node 1 parses a packet header of the data packet to obtain a matching entry, and matches the matching entry with the forwarding entries, where an action entry that is obtained through matching is to forward data to the network node 2. Therefore, the network node 1 forwards the data stream of the first service to a switch module in the network node 2. Similarly, according to the forwarding entry, the switch module in the network node 2 sends the data stream to the functional module 1 for processing. The functional module 1 processes the data and forwards the data to the switch module, and the switch module forwards the data to the functional module 2. The functional module 2 processes the data and forwards the data to the switch module, and the switch module forwards the data to the functional module 3. The functional module 3 processes the data and forwards the data to the switch module, and the switch module forwards the data to another network node according to the forwarding entry.

Figure 8:
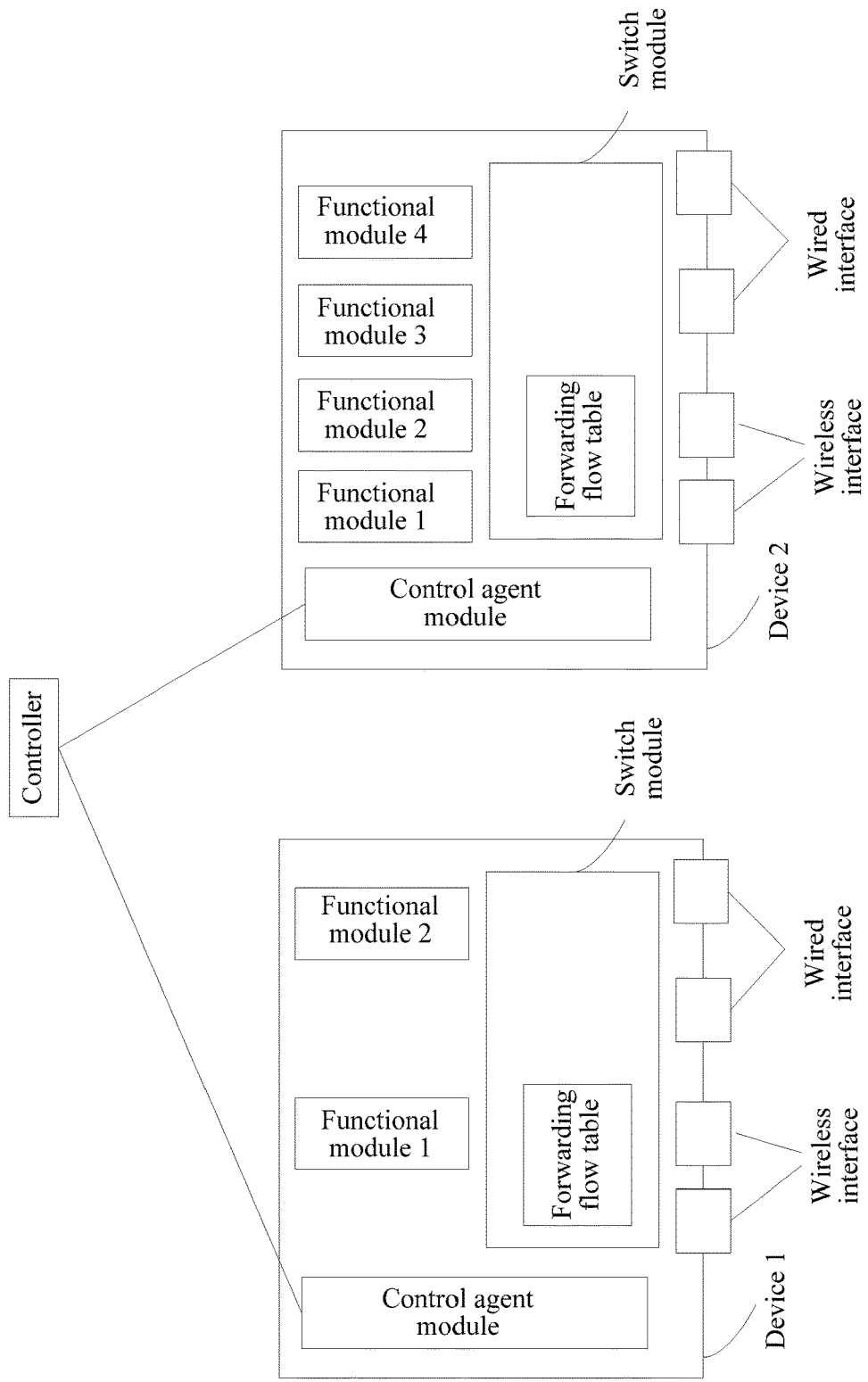
FIG. 8 is a schematic diagram of another data forwarding.

Alternatively, referring to FIG. 8, after determining that the data stream needs to be processed sequentially by a module 1 and a module 2 that are in the network node 1 and the module 3 and module 4 that are in the network node 2, the controller separately configures forwarding entries for the network node 1 and the network node 2. After receiving a data packet of the data stream, the switch module in the network node 1 parses a packet header of the data packet to obtain a matching entry, and matches the matching entry with the forwarding entries, where an action entry that is obtained through matching is to send the data packet of the data stream to the module 1 for processing. The module 1 processes the data packet and sends the data packet to the switch module again. The switch module continues to match the matching entry with the forwarding entries, where an action that is obtained through matching is to send the data packet of the data stream to the module 2 for processing. The module 2 processes the data packet and sends the data packet to the switch module again. The switch module matches the matching entry with the forwarding entries, where an action entry that is obtained through matching is to forward the data stream to the network node 2.

After receiving the data stream, the network node 2 performs a processing process the same as that performed by the network node 1: sequentially sends the data stream to the module 3 and the module 4 for processing, and eventually forwards the data stream to another network node.

For the data forwarding method provided in this embodiment of the present invention, by means of this method, a controller selects, according to terminal capability information of a terminal, service type information, and QoS information, N functional modules in L network nodes from M network nodes, where the N functional modules are all functional modules required for processing a data stream that corresponds to a service of the terminal, and the controller configures, for the L network nodes, corresponding entries for forwarding the data stream, so as to enable the data stream to be eventually forwarded to a target address after the data stream is processed by the required N modules. By means of such a method, multiple network nodes together service a data stream corresponding to one service, thereby reducing complexity of processing of a single network node and improving processing efficiency.

Figure 9:
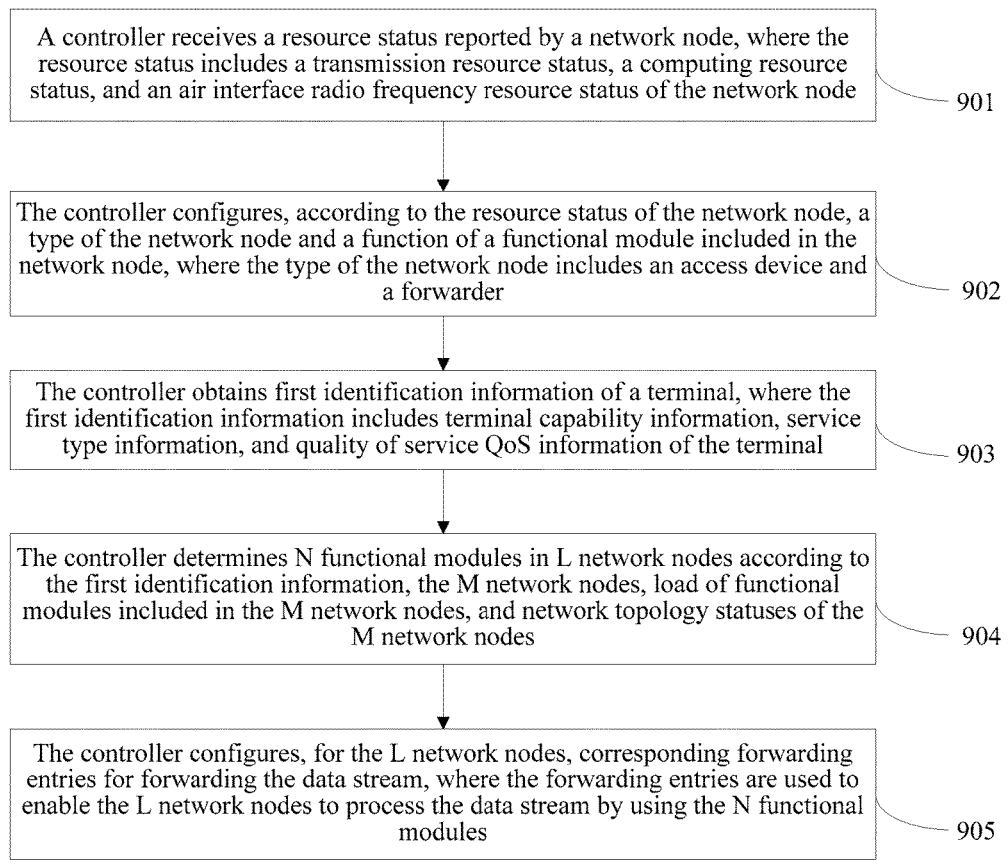
FIG. 9 is a flowchart of another data forwarding method.

Further, an embodiment of the present invention further provides a data forwarding method. Referring to FIG. 9, the method includes:

901. The controller receives a resource status reported by the network node, where the resource status includes a transmission resource status, a computing resource status, and an air interface radio frequency resource status of the network node.

The network node, in terms of hardware, may be a general-purpose programmable logical device such as an FPGA, may be a digital signal processor, or may be a general-purpose server. When the controller is connected to the network node, the network node reports a resource status and a network topology status of the network node to the controller. The resource status includes at least a transmission resource status, a computing resource status, and an air interface radio frequency resource status of the network node.

For example, if the network node is a general-purpose server, the computing resource includes a quantity of CPU cores, a clock speed, a storage resource and the like of the server. The transmission resource may include a transmission capability, for example, a quantity of network adapters and a transmission capacity of each network adapter.

902. The controller configures, according to the resource status of the network node, a type of the network node and a function of a functional module included in the network node, where the type of the network node includes an access device and a forwarder.

After receiving the resource status of the network node, the controller determines, according to a preset policy, the type of the network node, where the type includes an access device and a forwarder, and determines a function of a functional module included in the network node.

Specifically, a service processing capability of the network node is determined by the computing resource status and the transmission resource status of the network node. Whether the network node can support wireless access of a user is determined by the radio frequency resource status. If wireless access is supported, the network node is a wireless access device, and if wireless access is not supported, the network node is a forwarder.

The controller configures, according to a service requirement and an access requirement on the network and according to the resource status of the network node, the function of the functional module included in the network node. For example, if a video service is a main service on the network and the network node supports wireless access, that is, the type of the network node may be an access device, the functional module in the network node may include a physical layer processing module, a MAC layer processing module, an RLC layer processing module, and the like. Certainly, according to an actual requirement, the functional module has at least one function. For example, one functional module may have only a MAC layer processing function, or may simultaneously have a MAC layer processing function and an RLC layer processing function. In addition, if the network node has limited resource, the network node may have only a forwarding function and does not have the foregoing functional module. Whether the network node has the functional module is not specifically limited in this embodiment of the present invention.

Specifically, after determining the type of the network node and the function of the functional module included in the network node, the controller sends a control command to a control agent module of the network node. After receiving the control command, the control agent module of the network node parses the control command. For example, if a command "create LTE PHY" of creating an LTE physical layer processing module and a command "create LTE MAC" of creating an LTE MAC layer processing module delivered by the controller are obtained through parsing, the control agent module may obtain, in a manner such as downloading or activation, code required for creating the LTE physical layer processing module and the LTE MAC layer processing module, thereby creating the LTE physical layer processing module and the LTE MAC layer processing module.

903. The controller obtains first identification information of a terminal, where the first identification information includes terminal capability information, service type information, and quality of service QoS information of the terminal.

Specifically, reference may be made to step 501 in the foregoing embodiment for detailed technical features of step 903, which are not described in this embodiment of the present invention.

904. The controller determines N functional modules in L network nodes according to the first identification information, the M network nodes, load of functional modules included in the M network nodes, and network topology statuses of the M network nodes.

It should be noted that when the controller selects the L network nodes, load of the M network nodes, load of a functional module included in each network node, and network topology statuses of the M network nodes also need to be considered by the controller, apart from the first identification information. Specifically, load of a network node may be a combination of a CPU occupancy rate, a memory occupancy rate, a transmission bandwidth occupancy rate, or the like. Load of a functional module may be a ratio of a quantity of data streams that are being supported to a total quantity of data streams that can be supported.

The controller may preset a first threshold according to a present policy. The present policy is, for example, when load of a network node is determined, a memory occupancy rate of the network node is used as a reference. When the memory occupancy rate of the network node exceeds the first threshold, the network node is not considered during selection of the L network nodes from the M network nodes. Instead, the L network nodes are selected from other network nodes whose memory occupancy rates do not exceed the first threshold.

For another example, during selection of the functional module, a ratio of a quantity of data streams that are being supported to a total quantity of data streams that can be supported is used as a reference for load of the functional module to preset a second threshold. When a ratio of a quantity of data streams that are being supported by a functional module, for example, a functional module 1 in a network node 1 to a total quantity of data streams that can be supported by the functional module exceeds the second threshold, the functional module is not considered during selection of the N functional modules. Instead, the N functional modules are selected from other functional modules that have a function same as that of this module and whose ratios of a quantity of data streams that are being supported to a total quantity of data streams that can be supported does not exceed the second threshold.

In addition, if a network node has relatively low load that does not exceed the first threshold but a functional module configured to process an RLC layer service has relatively high load that exceeds the second threshold, the functional module already cannot service a newly added service stream. Therefore, a new RLC layer service processing functional module needs to be created in the network node or an RLC layer service processing module having relatively low load in another network node needs to be used to perform RLC layer processing on the data stream.

Further, to reduce a delay in data transmission, network topology statuses of the M network nodes are also considered when the controller selects the N functional modules in the L network nodes. If load of a terminal of the network node 1 is the same as that of a terminal of the network node 2 but a quantity of hops between the network node 1 and the terminal in a routing table is less than a quantity of hops between the network node 2 and the terminal in the routing table, the controller preferentially selects the network node 1 during selection of the L network nodes.

In addition, according to an actual situation, one or more network nodes in the L network nodes selected by the controller may have only a forwarding function, and do not process data. That is, the controller needs to configure, for the network nodes that only have a forwarding function, forwarding entries for the data stream that corresponds to the service, and may not necessarily configure functional modules for these network nodes.

It should be noted that, that the L network nodes include the N functional modules refers to that all functional modules that are active in the L network nodes include the N functional modules, or that the functional modules that are active in the L network nodes include none of the N functional modules or only some of the N functional modules, but the L network nodes can include the N functional modules by receiving a control command from the controller and creating new modules in the L network nodes.

For example, if the controller selects the L network nodes to process data in a data stream but modules in the L network nodes cannot fully meet a requirement for processing the data stream, a new functional module is created in at least one of the L network nodes to enable the L network nodes to include the N functional modules required for processing the data stream.

905. The controller configures, for the L network nodes, corresponding forwarding entries for forwarding the data stream, where the forwarding entries are used to enable the L network nodes to process the data stream by using the N functional modules.

Figure 10:
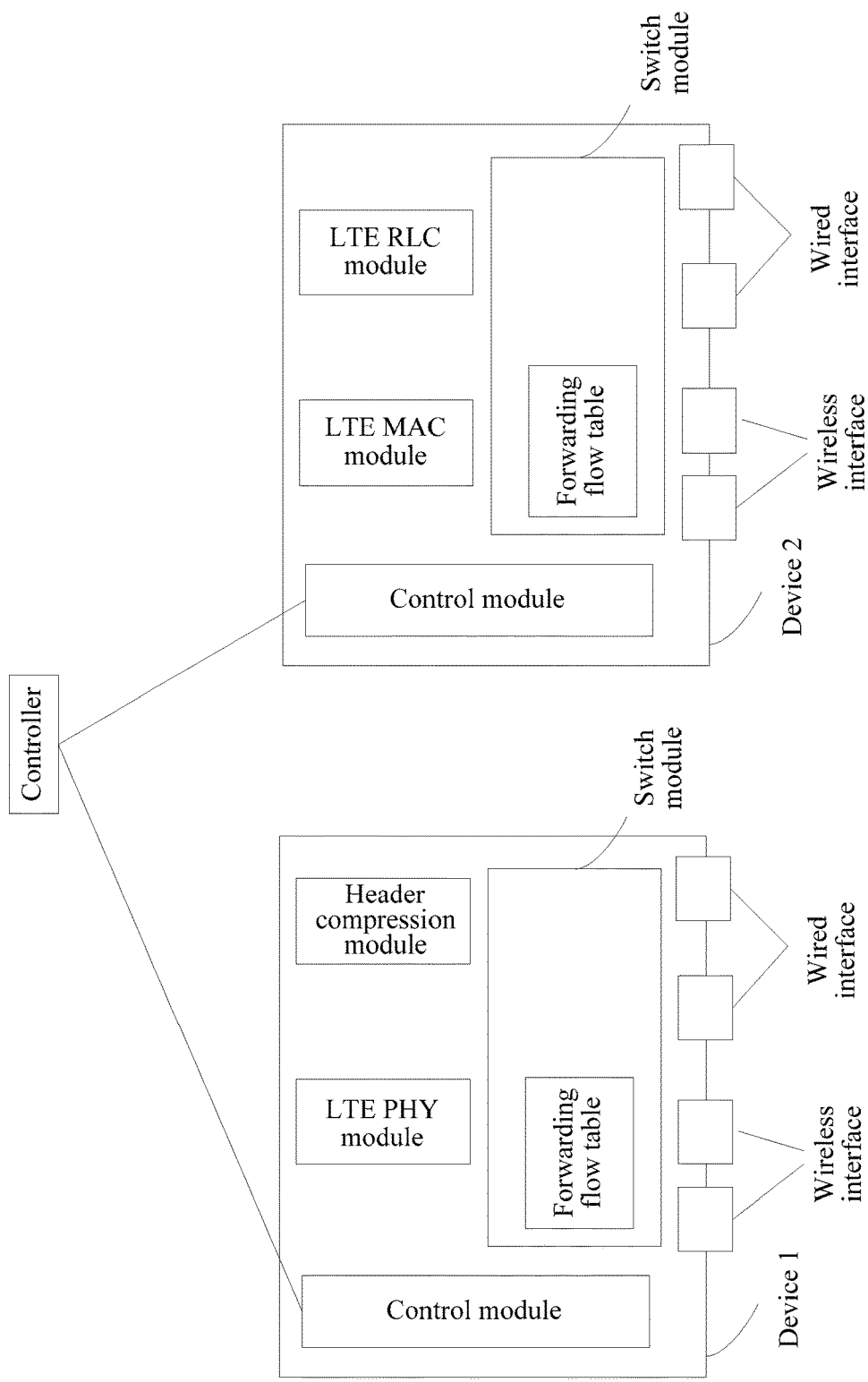
FIG. 10 is a schematic diagram of still another data forwarding.

For example, referring to FIG. 10, after a terminal sends a video service, a controller determines transmission by using an uplink LTE transmission mode, and the controller determines that LTE physical layer processing, LTE MAC layer processing, and LTE RLC layer processing need to be performed during processing of the data stream that corresponds to the service. If the controller determines that data needs to be processed by using an LTE physical layer functional module in a first network node and by an LTE MAC layer functional module and an LTE RLC layer functional module in a second network node, the controller delivers separately forwarding entries to the first network node and the second network node. After an LTE port of the first network node receives the data stream that corresponds to the service, the data stream enters a switch module in the first network node. The switch module matches a port number that corresponds to the data stream with the forwarding entries, where an action entry that is obtained through matching is to send the data stream to the LTE physical layer functional module for processing. Therefore, the switch module sends the data stream to the LTE physical layer functional module. The LTE physical layer functional module encapsulates a user identifier in a processed data packet and returns the data packet to the switch module in the first network node. The switch module in the first network node matches the user identifier of the data stream with maintained forwarding entries, where an action entry that is obtained through matching is to forward the data stream to the second network node, so that the switch module forwards the data stream to the second network node.

The switch module in the second network node matches the user identifier with the maintained forwarding entries, where an action entry that is obtained through matching is to forward the data stream to the LTE MAC layer of the second network node. Therefore, the switch module in the second network node sends the data stream to the LTE MAC layer functional module for processing. After processing the data, the LTE MAC layer functional module sends the data back to the switch module in the second network node. The switch module in the second network node matches a logical channel identifier carried in the data stream with the maintained forwarding entries, where an action entry that is obtained through matching is to forward the data stream to the LTE RLC layer functional module for processing. The data stream obtained through processing is returned to the switch module in the second network node, and the switch module in the second network node forwards the data stream to another network node according to matching of an IP address and the like of the data stream.

Certainly, the foregoing is merely a specific implementation manner of a matching relationship that is between a matching entry and an action entry and that is obtained by exchange modules in L network nodes in a fixed case, that is, in a case in which an access standard of a terminal and a service type and QoS of a service are all fixed. Because there are different types of services, different QoS of services, and different access standards used by a terminal, matching entries of the switch modules in the L network nodes are determined according to an actual situation. The matching entries may not necessarily be the foregoing user identifier, logical channel identifier, and the like, but may be other identification information.

For the data forwarding method provided in this embodiment of the present invention, by means of this method, a controller selects, according to terminal capability information of a terminal, service type information, and QoS information, N functional modules in L network nodes from M network nodes, where the N functional modules are all functional modules required for processing a data stream that corresponds to a service of the terminal, and the controller configures, for the L network nodes, corresponding entries for forwarding the data stream, so as to enable the data stream to be eventually forwarded to a target address after the data stream is processed by the required N modules. By means of such a method, multiple network nodes together service a data stream corresponding to one service, thereby reducing complexity of processing of a single network node and improving processing efficiency.

Figure 11:
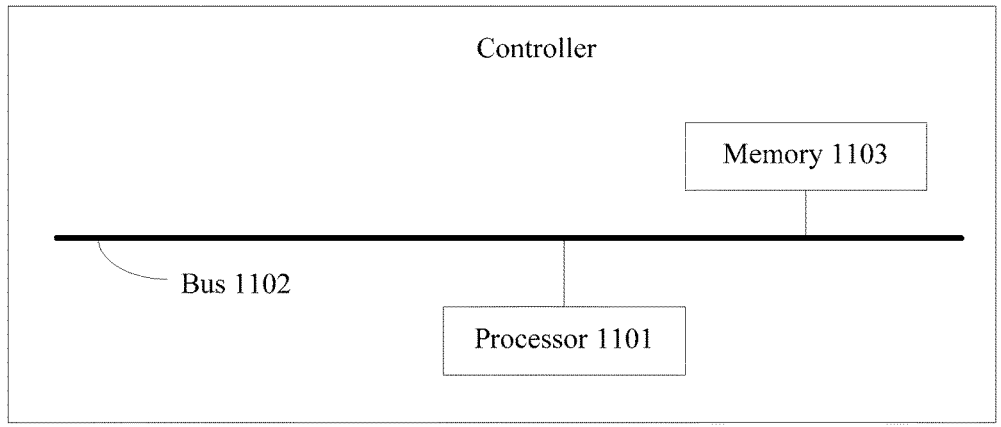
FIG. 11 is a fourth schematic diagram of a controller.

To resolve a problem of low efficiency of processing a service of a terminal by a single novel network node shown in FIG. 1, referring to FIG. 11, an embodiment of the present invention further provides a controller. The controller includes: a processor 1101, a bus 1102, and a memory 1103. The processor 1101 obtains, by using the bus 1102, an instruction stored in the memory 1103, so as to:

obtain first identification information of a terminal, where the first identification information includes terminal capability information, service type information, and quality of service QoS information of the terminal;

determine N functional modules in L network nodes from M network nodes according to the first identification information, where the N functional modules are configured to process a data stream that corresponds to a service of the terminal; and configure, for the L network nodes, corresponding forwarding entries for forwarding the data stream, where the forwarding entries are used to enable the L network nodes to process the data stream by using the N functional modules.

The processor 1101 is specifically configured to:

obtain information about an access standard supported by a network node accessed by the terminal;

determine, according to the terminal capability information of the terminal, information about an access standard supported by the terminal;

determine an access standard of the terminal according to the information about an access standard supported by the terminal and the information about an access standard supported by a network node accessed by the terminal; and select the N functional modules in the L network nodes from the M network nodes according to the access standard of the terminal, the service type information, and the QoS information.

Figure 12:
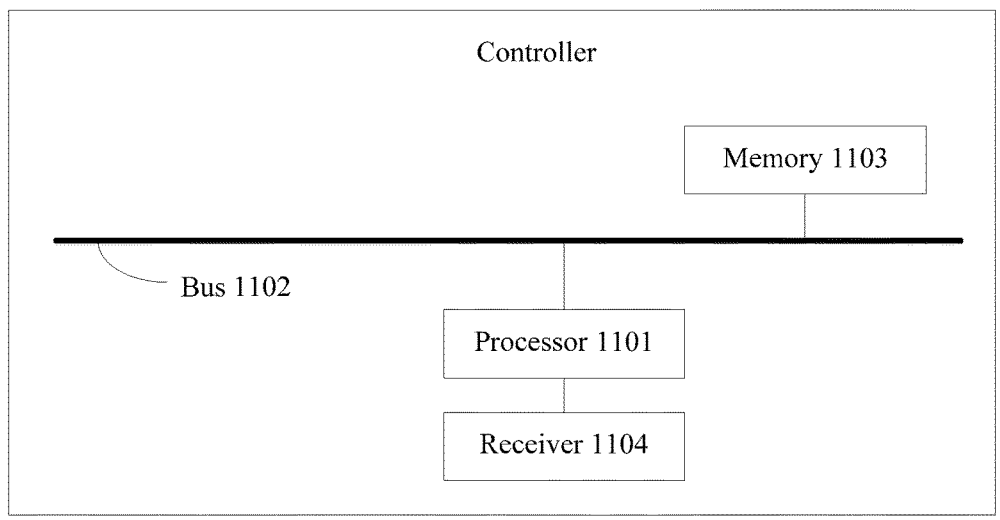
FIG. 12 is a fifth schematic diagram of a controller.

Referring to FIG. 12, the controller further includes a receiver 1104.

The receiver 1104 is configured to receive a resource status reported by a network node, where the resource status includes a transmission resource status, a computing resource status, and an air interface radio frequency resource status of the network node.

The processor 1101 is further configured to configure, according to the resource status of the network node, a type of the network node and a function of a functional module included in the network node, where the type of the network node includes an access device and a forwarder.

Optionally, the receiver 1104 is further configured to receive a network topology status reported by the network node.

The processor 1101 is specifically configured to:

determine the N functional modules in the L network nodes according to the first identification information, the M network nodes, load of functional modules included in the M network nodes, and network topology statuses of the M network nodes.

For the controller provided in this embodiment of the present invention, the controller selects, according to terminal capability information of a terminal, service type information, and QoS information, N functional modules in L network nodes from M network nodes, where the N functional modules are all functional modules required for processing a data stream that corresponds to a service of the terminal, and the controller configures, for the L network nodes, corresponding entries for forwarding the data stream, so as to enable the data stream to be eventually forwarded to a target address after the data stream is processed by the required N modules. By means of such a method, multiple network nodes together service a data stream corresponding to one service, thereby reducing complexity of processing of a single network node and improving processing efficiency.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A controller comprising:
   a processor; and
   a memory storing instructions that when executed by the processor configure the processor for:
   obtaining first identification information of a terminal, wherein the first identification information comprises terminal capability information, service type information, and quality of service QoS information of the terminal;
   obtaining information about an access standard supported by a network node accessed by the terminal;
   determining N functional modules in L network nodes from M network nodes according to the first identification information, wherein the N functional modules are configured to process a data stream that corresponds to a service of the terminal; and
   configuring, for the L network nodes, corresponding forwarding entries for forwarding the data stream, wherein the forwarding entries are used to enable the L network nodes to process the data stream by using the N functional modules,
   wherein the determining the N functional modules in the L network nodes from the M network nodes according the first identification information comprises:
      determining, according to the terminal capability information of the terminal, information about an access standard supported by the terminal;
      determining an access standard of the terminal according to the information about an access standard supported by the terminal and the information about an access standard supported by a network node accessed by the terminal; and
      selecting the N functional modules in the L network nodes from the M network nodes according to the access standard of the terminal, the service type information, and the QoS information.

2. The controller according to claim 1, wherein the memory stores instructions that when executed by the processor further configure the processor for:
   receiving a resource status reported by a network node, wherein the resource status comprises a transmission resource status, a computing resource status, and an air interface radio frequency resource status of the network node; and configuring, according to the resource status of the network node, a type of the network node and a function of a functional module comprised in the network node, wherein the type of the network node comprises an access device and a forwarder.

3. The controller according to claim 2, wherein the memory stores instructions that when executed by the processor further configure the processor for:
receiving a network topology status reported by the network node; and
determining the N functional modules in the L network nodes according to the first identification information, the M network nodes, load of functional modules comprised in the M network nodes, and network topology statuses of the M network nodes.

4. The controller according to claim 1, wherein the memory stores instructions that when executed by the processor further configure the processor for:
receiving a resource status reported by a network node, wherein the resource status comprises a transmission resource status, a computing resource status, and an air interface radio frequency resource status of the network node; and
configuring, according to the resource status of the network node, a type of the network node and a function of a functional module comprised in the network node, wherein the type of the network node comprises an access device and a forwarder.

5. A data forwarding method comprising:
obtaining, by a controller, first identification information of a terminal, wherein the first identification information comprises terminal capability information, service type information, and quality of service QoS information of the terminal;
obtaining information about an access standard supported by a network node accessed by the terminal;
determining, by the controller, N functional modules in L network nodes from M network nodes according to the first identification information, wherein the N functional modules are configured to process a data stream that corresponds to a service of the terminal; and
configuring, by the controller for the L network nodes, corresponding forwarding entries for forwarding the data stream, wherein the forwarding entries are used to enable the L network nodes to process the data stream by using the N functional modules,
wherein the determining, by the controller, the N functional modules in the L network nodes from the M network nodes according to the first identification information comprises:
determining, by the controller according to the terminal capability information of the terminal, information about an access standard supported by the terminal;
determining, by the controller, an access standard of the terminal according to the information about an access standard supported by the terminal and the information about an access standard supported by a network node accessed by the terminal; and
selecting, by the controller, the N functional modules in the L network nodes from the M network nodes according to the access standard of the terminal, the service type information, and the QoS information.

6. The method according to claim 5, wherein before the obtaining, by the controller, the first identification information of the terminal, the method further comprises:
receiving, by the controller, a resource status reported by a network node, wherein the resource status comprises a transmission resource status, a computing resource status, and an air interface radio frequency resource status of the network node; and
configuring, by the controller according to the resource status of the network node, a type of the network node and a function of a functional module comprised in the network node, wherein the type of the network node comprises an access device and a forwarder.

7. The method according to claim 6, wherein before the obtaining, by the controller, the first identification information of the terminal, the method further comprises:
receiving, by the controller, a network topology status reported by the network node; and
wherein the determining, by the controller, the N functional modules in the L network nodes from the M network nodes according to the first identification information comprises:
determining, by the controller, the N functional modules in the L network nodes according to the first identification information, the M network nodes, load of functional modules comprised in the M network nodes, and network topology statuses of the M network nodes.

8. The method according to claim 5, wherein before the obtaining, by the controller, the first identification information of the terminal, the method further comprises:
receiving, by the controller, a resource status reported by a network node, wherein the resource status comprises a transmission resource status, a computing resource status, and an air interface radio frequency resource status of the network node; and
configuring, by the controller according to the resource status of the network node, a type of the network node and a function of a functional module comprised in the network node, wherein the type of the network node comprises an access device and a forwarder.

9. A controller comprising:
a processor;
a bus: and
a memory,
wherein the processor obtains, by using the bus, instructions stored in the memory that when executed configure the processor for:
obtaining first identification information of a terminal, wherein the first identification information comprises terminal capability information, service type information, and quality of service QoS information of the terminal;
obtaining information about an access standard supported by a network node accessed by the terminal;
determining N functional modules in L network nodes from M network nodes according to the first identification information, wherein the N functional modules are configured to process a data stream that corresponds to a service of the terminal; and
configuring, for the L network nodes, corresponding forwarding entries for forwarding the data stream, wherein the forwarding entries are used to enable the L network nodes to process the data stream by using the N functional modules,
wherein the determining the N functional modules in the L network nodes from the M network nodes according to the first identification information comprises:
determining, according to the terminal capability information of the terminal, information about an access standard supported by the terminal;
determining an access standard of the terminal according to the information about an access standard supported by the terminal and the information about an access standard supported by a network node accessed by the terminal; and selecting the N functional modules in the L network nodes from the M network nodes according to the access standard of the terminal, the service type information, and the QoS information.

10. The controller according to claim 9, further comprising a receiver, wherein:

the receiver is configured for receiving a resource status reported by a network node, wherein the resource status comprises a transmission resource status, a computing resource status, and an air interface radio frequency resource status of the network node; and the processor is further configured for configuring, according to the resource status of the network node, a type of the network node and a function of a functional module comprised in the network node, wherein the type of the network node comprises an access device and a forwarder.

11. The controller according to claim 10, wherein the receiver is further configured for receiving a network topology status reported by the network node; and the processor is further configured for determining the N functional modules in the L network nodes according to the first identification information, the M network nodes, load of functional modules comprised in the M network nodes, and network topology statuses of the M network nodes.

12. The controller according to claim 9, wherein the controller further comprises a receiver configured for receiving a resource status reported by a network node, wherein the resource status comprises a transmission resource status, a computing resource status, and an air interface radio frequency resource status of the network node; and wherein the processor is further configured for configuring, according to the resource status of the network node, a type of the network node and a function of a functional module comprised in the network node, wherein the type of the network node comprises an access device and a forwarder.

* * * * *